June 30, 1925.
W. JETTER ET AL
BALL BEARING TROLLEY WHEEL
Filed Jan. 21, 1922
1,543,712
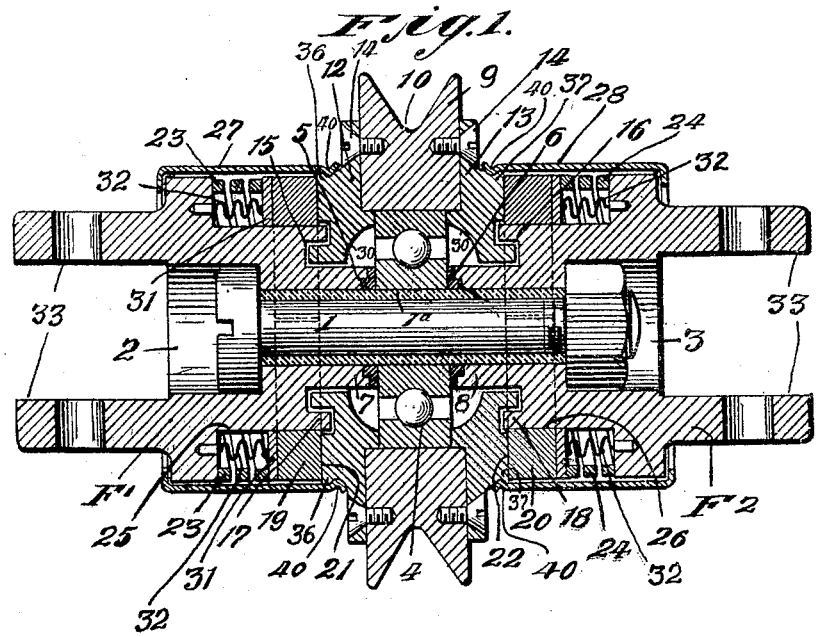
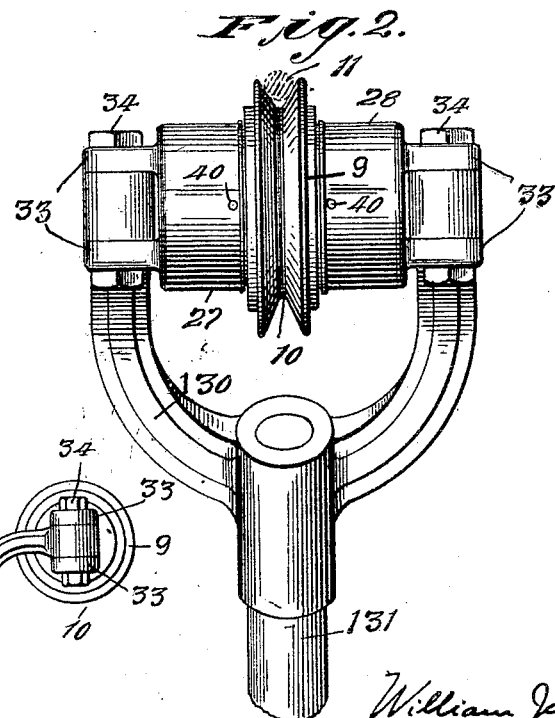
INVENTORS
William Jetter and
Walter S. Lemmon, by
A. C. Nolte, ATTORNEY.

Patented June 30, 1925.

1,543,712

UNITED STATES PATENT OFFICE.

WILLIAM JETTER, OF COLLINGSWOOD, NEW JERSEY, AND WALTER S. LEMMON, OF NEW YORK, N. Y.

BALL-BEARING TROLLEY WHEEL.

Application filed January 21 1922. Serial No. 530,935.

*To all whom it may concern:*

Be it known that we, WILLIAM JETTER, a citizen of the United States, residing in Collingswood, county of Camden, and State of New Jersey, and WALTER S. LEMMON, a citizen of the United States, residing in the city, county, and State of New York, have invented certain new and useful Improvements in Ball-Bearing Trolley Wheels, of which the following is a specification.

This invention relates to mountings for trolley wheels, particularly to wheels of the type which are provided with ball or other anti-friction bearings.

It proposes a form of mounting of the wheel which will preclude the passage of current through the bearing, protect the same from grit, dust and other foreign matter, and retain an adequate supply of lubricant adjacent thereto. The bearing is thus fully protected against injury, whether from electrical or mechanical causes.

The invention proposes, further, to provide electric brushes having large areas of contact for effecting the passage of current from the wheel to the trolley pole so that sparking and excessive heating are avoided. The brushes are preferably covered by a casing, the object of which is to exclude moisture and dust from the brushes. This casing is preferably mounted to revolve with the wheel so that water or other foreign matter is thrown off by centrifugal force and effectively prevented from entering the mechanism.

A further feature of the invention consists in the mechanical construction of the frame on which the wheel is mounted, this construction being such that the various parts of the mechanism may be readily assembled or disassembled, so that a worn wheel rim or any other part may readily be replaced. The wheel and its frame are constructed so as to constitute a unit which as such may be attached to or detached from the harp of the trolley pole. A unit in need of repair may, therefore, be readily replaced by another unit and the repair may be effected subsequently in the shop.

The above and certain other features of the invention are more particularly set forth in the following description in which reference is had to the accompanying drawings in which:

Figure 1 is a view showing one form of embodiment of the invention in cross section;

Figure 2 is a view showing the device of Figure 1 mounted in the harp of a trolley pole; and Figure 3 is a view showing a side elevation of Figure 2.

Similar characters of reference designate similar parts in each of the views.

As shown in Figure 1, the frame on which the trolley wheel is mounted comprises a pair of castings $F^1$ and $F^2$ which are similar to each other in all respects. The two parts of the frame are secured together by means of a bolt 1, provided with a sleeve $1^a$ of insulating material. The head and nut of the bolt are received in recessed portions 2 and 3 of the castings. The inner race of a ball bearing 4 is mounted on the sleeve $1^a$, and rings 5 and 6 of insulating material are provided between the sides of the race and the hubs 7 and 8 of the frame to insulate the same therefrom. The inner race of the bearing is thus completely insulated from the frame.

The trolley wheel proper consists of a rim 9 having the usual V-shaped groove 10 for receiving the trolley wire 11 (Figure 2). This rim is mounted on the outer race of the ball bearing where it is retained in position by means of fins 12 and 13, which are secured to the rim by means of screws 14. These fins are annular in shape and identical in construction. Besides retaining the rim they serve for the purpose of protecting the ball bearing from grit or other foreign matter, being for this purpose provided with recesses 15 and 16 which cooperate with corresponding shoulders 17 and 18 of the castings to constitute labyrinthian passages for preventing the entrance of grit to the bearing.

At their inner circumference the fins are recessed as indicated at 30, to form chambers adjacent the bearing, which serve to retain an adequate supply of bearing lubricant, such as grease or heavy oil. By virtue of this feature the wheel may be operated for long periods of time without renewal of the lubricant. The escape of the lubricant is prevented by the labyrinthian passages, which serve, thus, a dual purpose.

The current collected from the trolley wire is conducted to the wheel frame by means of brushes 19 and 20 which are annular in shape and arranged to coact with flat end surfaces 21 and 22 provided on the fins. The brushes are seated on cylindrical surfaces 25 and 26 provided in recesses of castings F¹ and F² and are held in contact with the fins by means of helical springs 23 and 24, bearing washers 31 being interposed between the brushes and the springs. The washers are electrically connected to the parts of the frame by means of a plurality of flexible conductors or "pigtails" 32. By virtue of this feature the necessity of providing each brush with a separate pigtail and the need of fastening the pigtail to the frame at each renewal of the brush are entirely eliminated. Moreover, the annular brushes are preferably divided into a pair of segments. These may be replaced when worn by merely opening the dust caps 27 and 28 hereinbelow referred to. It is, therefore, unnecessary to take the frame apart in order to replace a brush.

By virtue of the arrangement above described, we obtain a large area of contact and low contact resistance. The passage of current through the ball bearing and the consequent injury thereof are thus effectively precluded. The material of which the brushes are constructed is preferably a metal-graphite composition, well known in the art, having a high conductivity and being self-lubricating. As the brushes wear, they are fed along the cylindrical guide surfaces 25 and 26 of the frame by means of the springs and thus retained in firm contact with the fins. A low resistance of contact is thus constantly maintained.

To protect the contact surfaces as well as the other internal parts of the unit from rain, snow or dust, we provide dust caps 27 and 28 which slip over shoulders 36 and 37 on which they are retained by any quickly detachable securing means, such as cooperating depressions 40 in the shoulders and in the caps. The caps have such internal diameter as to provide clearance over the external surface of the frame.

An important feature of the above-described construction consists in the fact that the caps are secured to the wheel proper and thus caused to revolve therewith. Water or other foreign matter is, therefore, thrown off by centrifugal force. A very effective protection to the interior mechanism is thus obtained.

For mounting the complete unit in the harp 130 of a trolley pole 131, the castings F¹ and F² are provided with lugs 33 having openings for cooperating with bolts 34 to secure the unit in the harp. The forks of the harp are preferably bent as indicated in Figure 3, so that the upward pressure of the pole is transmitted from the harp to the wheel unit without the exertion of shearing strain on the bolt 34.

It will be noted from the above description that the entire wheel unit is symmetrical in construction, so that all parts are interchangeable and the number of spare parts which need be kept in stock is reduced to a minimum. The assembly or disassembly of the unit may be effected without difficulty, and the replacement of any one part is reduced to a simple operation.

It will be noted that although the above description has particular reference to the ball type of anti-friction bearing, it will be expressly understood that any other anti-friction or other suitable type of bearing may be employed. In any event, however, it is important that the bearing be of a type which will withstand end thrusts in either direction, these thrusts being exerted on the wheel particularly when the car is rounding curves. The ball bearing which is illustrated in the drawing is provided with deep grooved races for rendering it capable of withstanding thrusts.

Although we have herein shown and described only one form of device embodying the invention, it will be readily understood that many changes and modifications may be made therein within the scope of the following claims without departing from the spirit and scope of the invention.

What we claim is:

1. In combination, a wheel frame comprising a pair of separable members, an anti-friction bearing secured in and insulated from said frame, a wheel rim mounted on said bearing, and a fastening element extending laterally outward from each of said members, whereby the frame may be mounted in the harp of a trolley pole.

2. In combination, a wheel frame composed of a pair of similar separable members, an anti-friction bearing comprising an inner and an outer race, means for detachably securing said members to each other so as to fix the inner race of said bearing in said frame, means for insulating said race, and a wheel rim detachably mounted on the outer race of said bearing.

3. In combination, a wheel frame, a wheel rim, an anti-friction bearing for revolvably mounting said rim on said frame, and means for protecting said bearing from foreign matter, said means comprising a guard on said rim, said guard and frame being separated by labyrinthian passages.

4. In combination, a frame, a trolley wheel, a bearing between said frame and wheel, means on said wheel constituting a chamber for receiving a supply of lubricant for the said bearing, and means constituting labyrinthian passages from the exterior of the frame to said chamber to prevent the flow of lubricant therefrom.

5. In combination, a wheel frame, a rim member, an anti-friction bearing for revolvably mounting said member on said frame, a plurality of annular brushes for engaging the faces of said member, said frame having cylindrical surfaces for guiding said brushes, and resilient means for holding said brushes in engagement with said member.

6. In combination, a wheel frame, a rim member, an anti-friction bearing interposed between said frame and said member, said member and said casing having interengaging surfaces for protecting said bearing from foreign matter and retaining lubricant in said bearing, a pair of annular brushes for contacting with the said member, said frame having cylindrical guide surfaces for said brushes, and dust caps secured to said member to cover said brushes.

7. In combination, a trolley wheel, a frame, means for revolubly mounting said wheel in said frame, a brush for conducting electric current from said wheel to said frame, and a dust cap for covering said brush and frame affixed to said wheel, whereby when said wheel is in operation, water or other foreign matter is flung off said cap by centrifugal force.

8. In combination, a frame, a trolley wheel revolubly mounted therein, a brush for conducting current off said wheel, a washer for engaging said brush, resilient means for holding said washer in engagement with said brush, and a pigtail for electrically connecting said washer to the frame.

9. In combination, a frame, a trolley wheel revolubly mounted therein, an annular brush for cooperating with said wheel, said brush comprising a plurality of segments, and means for conducting the current collected by said brush to said frame.

10. In combination, a frame comprising a pair of separable members, a fastening element for uniting said elements to each other, an antifriction bearing comprising an inner and an outer race, said inner race being mounted on said fastening element, and a wheel rim mounted on the outer race of said bearing.

11. In combination, a frame comprising a pair of separable members, a fastening element for uniting said elements to each other, an antifriction bearing comprising an inner and an outer race, said inner race being mounted on said fastening element, a wheel rim mounted on the outer race of said bearing, and a brush for conducting electric current from said wheel rim to said frame.

12. In combination, a frame, a rim member, an antifriction bearing for revolvably mounting said member on said frame, said bearing being insulated from the said frame, an annular brush for cooperating with said member to deliver current therefrom to said frame, and resilient means for holding said brush in cooperative relation to said rim member.

In testimony whereof we have affixed our signatures to this specification.

WILLIAM JETTER.
WALTER S. LEMMON.